US008208404B1

(12) United States Patent  
Kothari (10) Patent No.: US 8,208,404 B1  
(45) Date of Patent: Jun. 26, 2012

(54) PSEUDOWIRE ESTABLISHMENT TO SITES ACROSS AUTONOMOUS SYSTEMS WITH OVERLAPPING CUSTOMER SITE ID SPACE

(75) Inventor: Bhupesh Kothari, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 432 days.

(21) Appl. No.: 12/610,686

(22) Filed: Nov. 2, 2009

(51) Int. Cl.  
*H04L 12/28* (2006.01)  
*H04L 12/54* (2006.01)  
*H04J 3/24* (2006.01)

(52) U.S. Cl. ......... 370/254; 370/400; 370/401; 370/469

(58) Field of Classification Search .................. None  
See application file for complete search history.

(56) References Cited

U.S. PATENT DOCUMENTS

| | | | |
|---|---|---|---|
| 7,710,902 B2* | 5/2010 | Vasseur et al. ................. | 370/254 |
| 2006/0182122 A1* | 8/2006 | Davie et al. .............. | 370/395.53 |
| 2006/0291445 A1* | 12/2006 | Martini et al. ................ | 370/351 |
| 2009/0190515 A1* | 7/2009 | Finn et al. ..................... | 370/312 |

OTHER PUBLICATIONS

Rosen, Eric, et al., "BGP/MPLS IP VPNs", draft-ietf-l3vpn-rfc2547bis-03.txt, Network Working Group, Oct. 2004.*  
Rekhter, Y., et al., "A Border Gateway Protocol 4 (BGP-4)", RFC 4271, Network Working Group, Jan. 2006.*

\* cited by examiner

*Primary Examiner* — Anh-Vu H Ly  
*Assistant Examiner* — Cassandra Decker  
(74) *Attorney, Agent, or Firm* — Harrity & Harrity, LLP (57) ABSTRACT

A method performed by a provider edge device in a multi-autonomous system (AS) includes receiving advertisements from other PEs of the multi-AS, where one or more of the advertisements includes a destination AS parameter that indicates a destination AS of the multi-AS; generating pseudowire (PW) tables based on the advertisements received from the other PEs; and establishing PWs with respect to the other PEs based on the PW tables.

19 Claims, 11 Drawing Sheets

PSEUDOWIRE ESTABLISHMENT TO SITES ACROSS AUTONOMOUS SYSTEMS WITH OVERLAPPING CUSTOMER SITE ID SPACE

BACKGROUND

In Virtual Private Local Area Network (LAN) Service (VPLS) environments, a unique identifier (referred to as a customer site ID) may be assigned to each customer site. When a VPLS environment includes multiple Autonomous Systems (ASs) there may be instances where customer sites have the same customer site ID. In such instances, these same customer site IDs associated with different customer sites may cause a customer site ID collision. A provider edge device (PE) may detect such a collision and may not set up any pseudo-wires (PWs) for the customer sites involved in the customer site ID collision.

SUMMARY

According to an exemplary implementation, a method may be performed in a multi-autonomous system (AS). The method may include receiving, by a PE, advertisements from other PEs of the multi-AS, where one or more of the advertisements include a destination AS parameter that indicates a destination AS of the multi-AS; generating, by the PE, pseudo-wire (PW) tables based on the advertisements received from the other PEs; and establishing, by the PE, PWs with respect to the other PEs, based on the PW tables.

According to another exemplary implementation, a PE may include one or more memories to store instructions; and one or more processors to execute the instructions in the one or more memories to receive advertisements from other PEs in a multi-autonomous system (AS), where one or more of the advertisements include a source AS parameter that indicates a source AS and a destination AS parameter that indicates a destination AS; generate pseudo-wire (PW) tables based on the advertisements received from the other PEs; and establish PWs based on the PW tables, with respect to each of the other PEs.

According to yet another implementation, a computer-readable medium may have stored thereon instructions, executable by at least one processor. The computer-readable medium may include one or more instructions for receiving advertisements from other PEs in a multi-autonomous system (AS), where one or more of the advertisements include a source AS parameter that indicates a source AS and a destination AS parameter that indicates a destination AS; one or more instructions for generating pseudo-wire (PW) tables based on the advertisements received from the other PEs; and one or more instructions for establishing PWs based on the PW tables, with respect to the other PEs.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a flow diagram illustrating an exemplary process to avoid customer site ID collision in a multi-AS.

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims and equivalents.

The term "data unit," as used herein, may refer to a packet, a datagram, a frame, or a cell, a fragment of a packet, a fragment of a datagram, a fragment of a frame, a fragment of a cell, or another type or arrangement of data.

The term "multi-AS," as used herein, may refer to multiple autonomous systems.

Implementations described herein may provide for methods, devices, and/or systems to avoid customer site ID collisions in a multi-AS system. In an exemplary implementation, a PE may include destination AS information when the PE advertises its VPLS network layer reachability information (NLRI) to other PEs. Under this approach, a PE receiving an advertisement may select the appropriate advertisement based on the destination AS information and correspondingly setup PWs with the PE that sent the advertisement. This is contrast to conventional approaches in which customer site ID collision in a multi-AS system may cause PWs to not be set-up. For example, FIGS. 1A and 1B are diagrams illustrating an exemplary network in which a customer side ID collision in a multi-AS network may occur.

Figure 1A:
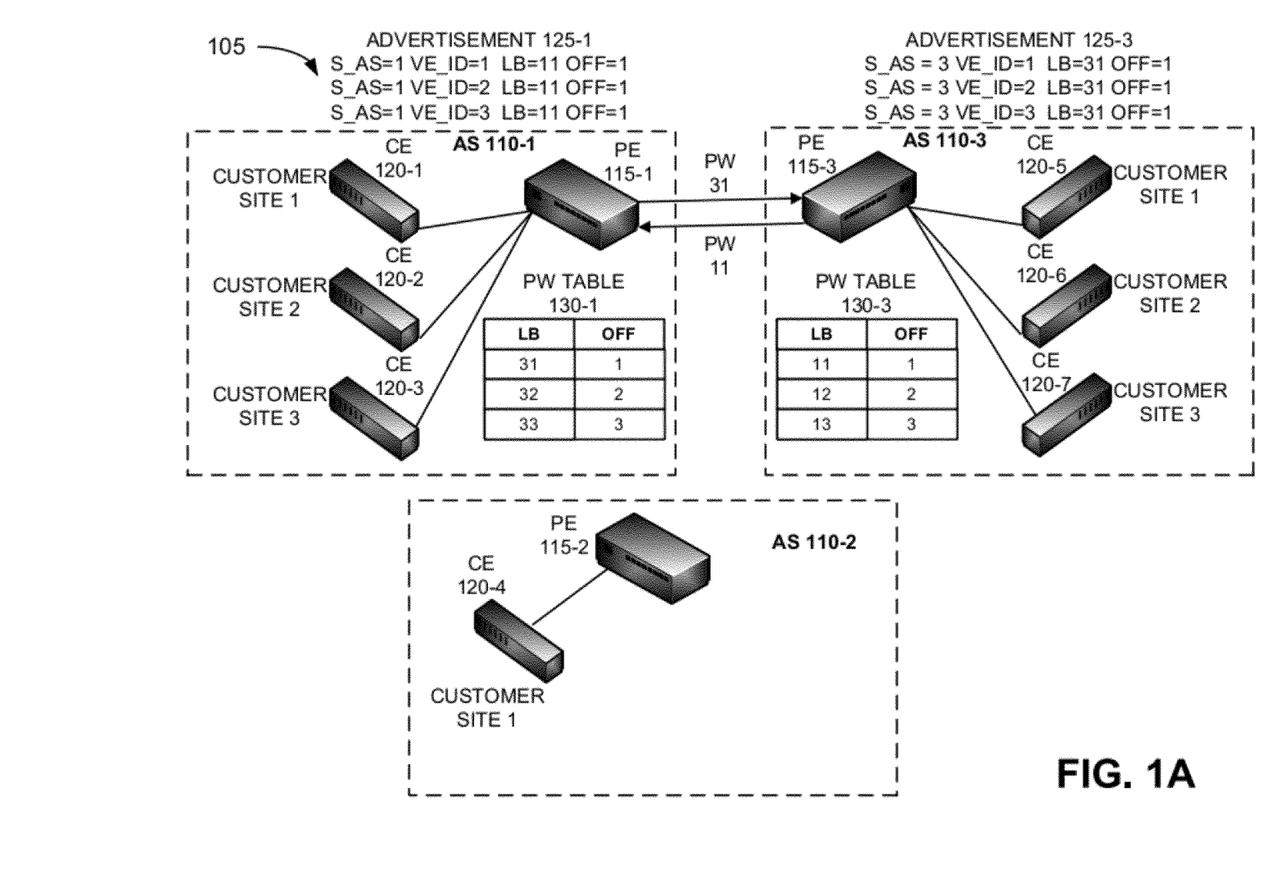
FIGS. 1A and 1B are diagrams illustrating an exemplary network in which a customer side ID collision in a multi-AS network may occur.
Figure 1B:
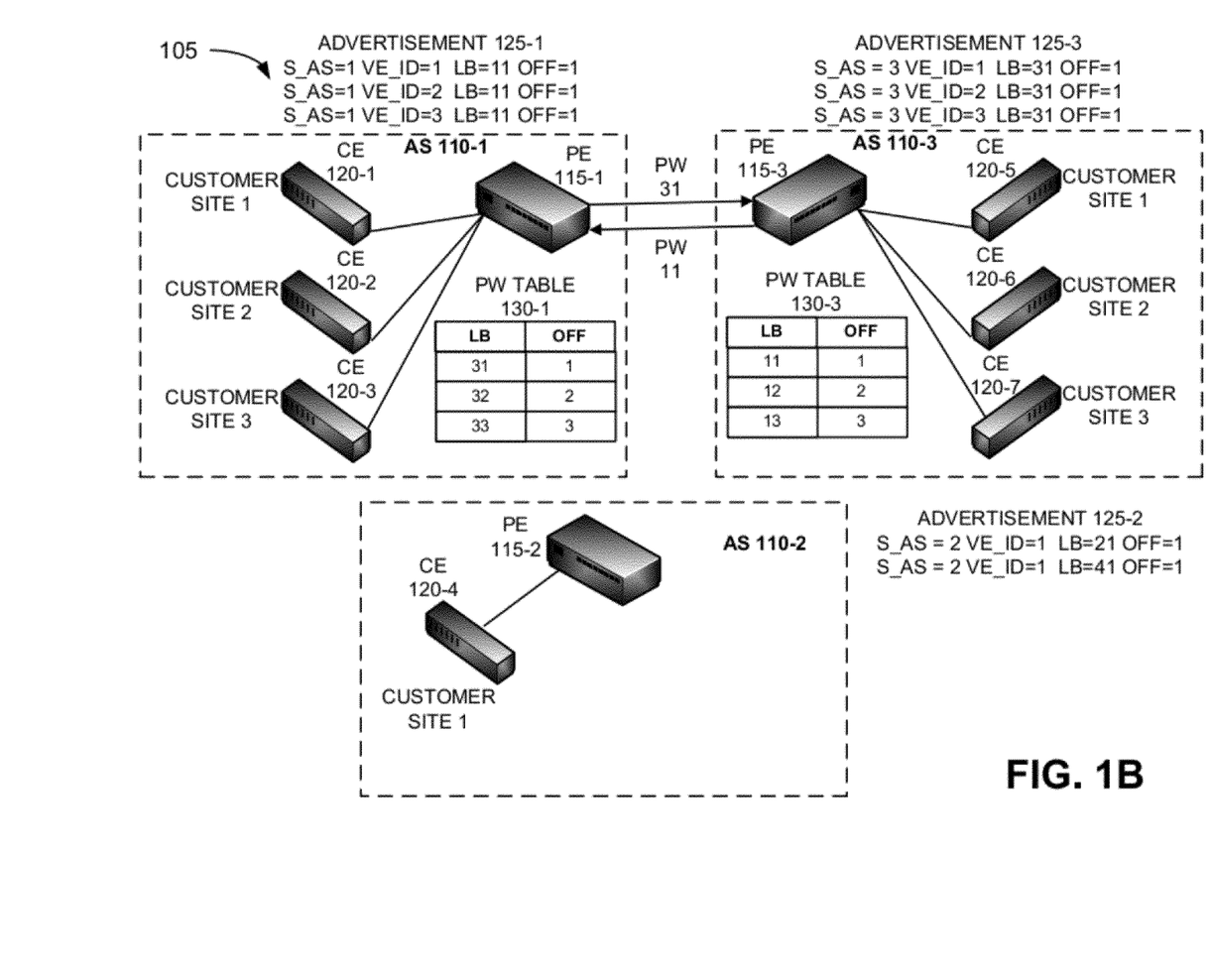

Referring to FIG. 1A, network 105 may include ASs 110-1 through 110-3 (referred to generally as AS 110 or ASs 110), PEs 115-1 through 115-3 (referred to generally as PE 115 or PEs 115), and customer edge devices (CEs) 120-1 through 120-7 (referred to generally as CE 120 or CEs 120). CEs 120 may be associated with customer sites 1, 2, and 3 in AS 110-1 and AS 110-3, respectively, while CE 120-4 may be associated with customer site 1 in AS 110-2, as illustrated in FIGS. 1A and 1B.

PEs 115 may advertise information associated with the customer sites that they serve. For example, in AS 110-1, PE 115-1 may advertise for customer sites 1, 2 and 3; in AS 110-2, PE 115-2 may advertise for customer site 1; and in AS 110-3, PE 115-3 may advertise for customer sites 1, 2, and 3. Advertisements 125-1, 125-2, and 125-3 may be generally referred to as advertisement 125.

The information included in advertisement 125 may correspond to a VPLS NLRI advertisement. For example, advertisement 125 may include a source AS (S_AS) parameter, a VE_ID parameter, a label base (LB) parameter, and a block offset (OFF) parameter. The S_AS parameter may identify the source AS of advertisement 125. The VE_ID parameter may identify a customer site. For example, advertisement 125-1 may include VE_D=1, VE_ID=2, and VE_ID=3 in correspondence to customer sites 1, 2 and 3. The LB parameter may correspond to a starting value of a label in an advertised label block. The OFF parameter (also referred to as VE block offset) may correspond to a starting customer site ID value that may map to the LB contained in advertisement 125.

OFF may be used to identify the label block from which a particular label value may be selected to setup a PW for a remote customer site.

Referring to advertisement 125-1, PE 115-1 may allocate the same set of LB parameter values to each of the customer sites that it services so that any remote PE (e.g., PE 115-2 and PE 115-3) may create one PW for sending traffic to PE 115-1. For example, as illustrated in advertisement 125-1, the LB parameter values for each of customer sites 1, 2, and 3 are the same (i.e., LB=11). In addition, the OFF parameter values for each of customer sites 1, 2, and 3 may be the same (i.e., OFF=1). As described below, the LB values and the OFF values may be used to create PW tables 130-1, 130-2, and 130-3 (referred to generally as PW table 130 or PW tables 130).

PEs 115 may create PW tables 130. For example, as illustrated in FIG. 1A, PE 115-1 may create a PW table 130-1. PW table 130-1 may include the outgoing PWs from PE 115-1 to PE 115-3. PE 115-1 may create PW table 130-1 based on LB and OFF parameters values associated with advertisement 125-3 of PE 110-3. As illustrated, PW table 130-1 may include entries, such as, for example, LB=31 and OFF=1, LB=32 and OFF=2, and LB=33 and OFF=3. LB=31 and OFF=1, which correspond to LB=31 and OFF=1 advertised in advertisement 125-3, may be used as starting values to create the entries in PW table 130-1. Since PE 115-1 services customer sites 1, 2, and 3, PE 115-1 may increment from the starting values (e.g., by one) to provide the entries LB=32 and OFF=2, and LB=33 and OFF=3. In this way, LB=31 and OFF=1 may correspond to customer site 1, LB=32 and OFF=2 may correspond to customer site 2, and LB=33 and OFF=3 may correspond to customer site 3.

Based on these entries, PE 115-1 may establish PWs 31, 32, and 33 with respect to PE 115-3. PW 31 may be designated as the active PW (i.e., PW 31 may be in an active state), while PWs 32 and 33 may be designated as standby PWs (i.e., PWs 32 and 33 may be in a standby state). PE 115-1 may select the active PW (i.e., PW 31) based on the lowest VE_ID (i.e., VE_ID=1) to which PE 115-1 services. For example, based on the entries LB=31 and OFF=1, PE 115-1 may setup PW 31, which connects PE 115-1 to PE 115-3 and numerically (i.e., PW 31) corresponds to LB=31, as an active PW. That is, OFF=1, OFF=2, and OFF=3, in PW table 130-1, may numerically correspond to VE_ID=1 (for customer site 1), VE_ID=2 (for customer site 2), and VE_ID=3 (for customer site 3). PE 115-1 may refer to PW table 130-1 and may match the lowest VE_ID parameter (i.e., VE_ID=1) with the OFF parameter (i.e., OFF=1), which is mapped to LB=31 and corresponds to PW 31.

PE 115-2 and PE 115-3 may create their own PW tables 130. For example, PE 110-3 may create PW table 130-3 based on advertisement 125-1. PE 110-3 may utilize the LB and OFF parameter values associated with advertisement 125-1 to build PW table 130-3. In this example, LB=11 and OFF=1. In a similar manner, PE 115-3 may build PW table 130-3 by incrementing from these starting values. In this example, the lowest VE_ID value of the customer site to which PE 110-3 services, is 1. PE 110-3 may increment the LB and OFF parameter values until OFF=3. That is, OFF=1, OFF=2, and OFF=3, in PW table 130-3, may numerically correspond to VE_ID=1 (for customer site 1), VE_ID=2 (for customer site 2), and VE_ID=3 (for customer site 3). PE 110-3 may designate PW 11 as the active outgoing PW to PE 115-1. PE 115-3 may refer to PW table 130-3 and may match the lowest VE_ID parameter value (i.e., VE_ID=1) with the OFF parameter (i.e., OFF=1), which is mapped to LB=11 and corresponds to PW 11.

Based on this framework, referring to FIG. 1B, assume that PE 115-2 receives advertisement 125-1 (e.g., S_AS=1 VE_ID=1 LB=1 OFF=1) from PE 115-1 of AS 110-1 and receives advertisement 125-3 (e.g., S_AS=3 VE_ID=1 LB=31 OFF=1) from PE 115-3 of AS 110-3. However, under these circumstances, a problem arises since customer site IDs, which correspond to the VE_ID parameter values, are the same between AS 110-1 and AS 110-3. While PE 115-2 may be able to differentiate between advertisement 125-1 and 125-3 based on the S_AS parameter, PE 115-1 and PE 115-3 may not be able to select an appropriate advertisement 125-2 from PE 115-2 to build a PW table 130 and corresponding PW. For example, advertisement 125-2 may include S_AS=2 VE_ID=1 LB=21 OFF=1 and S_AS=2 VE_ID=1 LB=41 OFF=1, in which the same VE_ID parameter value is present. Accordingly, PE 115-1 and PE 115-3 may not setup PWs with PE 115-2.

Figure 2A:
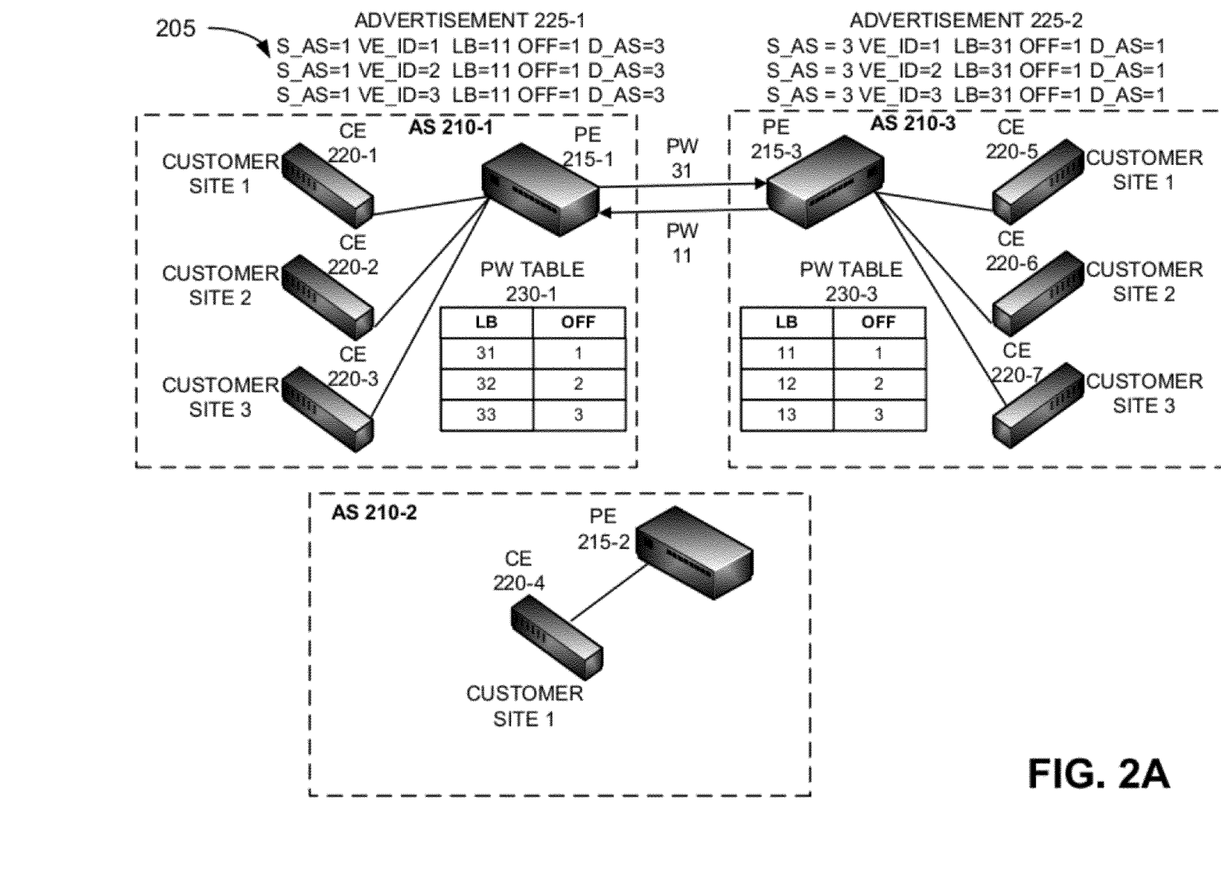
FIGS. 2A and 2B illustrate an exemplary network in which an exemplary implementation of methods, devices, and/or systems to avoid customer side ID collision in a multi-AS network may be utilized.
Figure 2B:
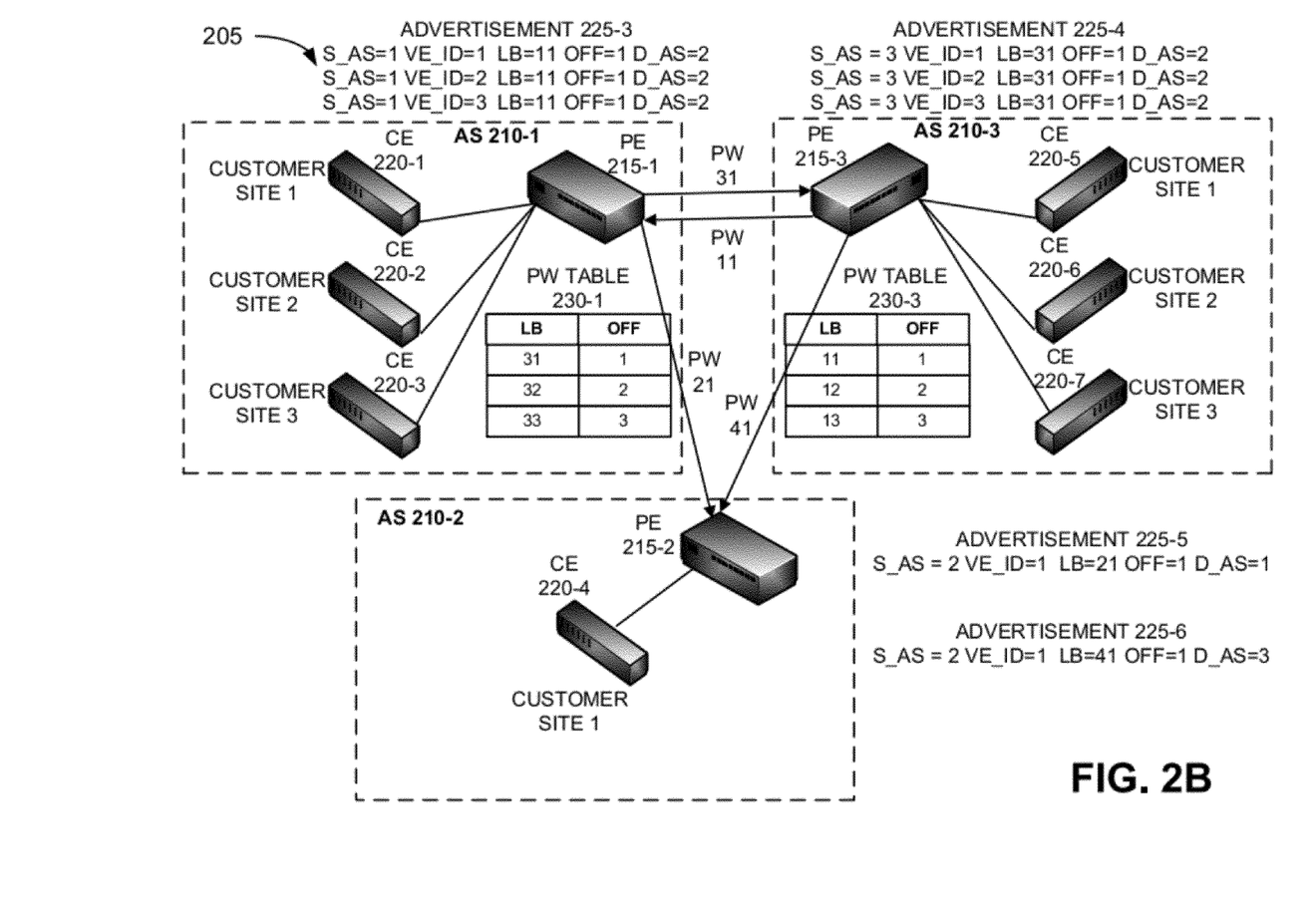

FIGS. 2A and 2B illustrate an exemplary network in which an exemplary implementation of methods, devices, and/or systems to avoid customer side ID collision in a multi-AS network may be utilized.

Referring to FIG. 2A, network 205 may include ASs 210-1 through 210-3 (referred to generally as AS 210 or ASs 210), PEs 215-1 through 215-3 (referred to generally as PE 215 or PEs 215), and customer edge devices (CEs) 220-1 through 220-7 (referred to generally as CE 220 or CEs 220). CEs 220 may be associated with customer sites 1, 2, and 3 in AS 210-1 and AS 210-3, respectively, while CE 220-4 may be associated with customer site 1 in AS 210-2, as illustrated in FIG. 2A.

Network 205 may include, for example, a multiprotocol label switching (MPLS)-based network, a border gateway protocol (BGP)-based network, a VPLS network, an Internet Protocol (IP) network, etc. Network 205 may include one or more service provider networks. Network 205 may correspond to a multi-AS.

PE 215 may include a device capable of communicating with other devices, systems, networks, and/or the like. For example, PE 215 may correspond to a network computer, a router, a gateway, an access device, and/or some other type of communication device that may receive, process and/or transmit network traffic (e.g., data units). PE 215 may provide connectivity between customer sites. In some instances, PE 215 may serve more than one customer site.

CE 220 may include a device capable of communicating with other devices, systems, networks, and/or the like. For example, CE 220 may correspond to a router, a network computer, an access device, a user device (e.g., a desktop computer, laptop computer, etc.), or some other type of communication device. CE 220 may connect one or more customer sites to PE 215.

The number of devices and configuration in network 205 is exemplary and provided for simplicity. In practice, network 205 may include additional devices and/or ASs, fewer devices and/or ASs, different devices and/or ASs, and/or differently arranged devices and/or ASs than those illustrated in FIG. 2A. For example, while FIG. 2A illustrates three PEs 215 and three CEs 220 in AS 210-1 and AS 210-3, one or more ASs may include additional or fewer PEs 215 and/or CEs 220. Additionally, or alternatively, network 205 may include other devices, such as, for example, AS border routers. Also, some functions described as being performed by a particular device may be performed by a different device or a combination of devices.

PEs 215 may advertise information associated with the customer sites that they serve. For example, in AS 210-1, PE 215-1 may advertise for customer sites 1, 2 and 3; and in AS 210-3, PE 215-3 may advertise for customer sites 1, 2, and 3. Similar to that previously described, PE 215-1 may advertise advertisement 225-1 and PE 215-3 may advertise advertisement 225-2. As illustrated in FIG. 2A, PEs 215-1 and 215-3 may generate PW tables 230-1 and 230-2 and create PWs 31 and 11.

The information included in advertisement 225 may correspond to a VPLS NLRI advertisement. For example, in an exemplary implementation, advertisement 225 may include a source AS (S_AS) parameter, a VE_ID parameter, a label base (LB) parameter, and a block offset (OFF) parameter. The S_AS parameter, the VE_ID parameter, the LB parameter, the OFF parameter may include analogous information to that previously described with respect to advertisement 125. Additionally, in contradistinction to advertisement 125, advertisement 225 may include a destination AS (D_AS) parameter. The D_AS parameter may identify the destination AS for advertisement 225.

In other exemplary implementations, advertisement 225 may include additional parameters, fewer parameters, and/or different parameters. For example, advertisement 225 may include a preference (PREF) parameter and/or other types of parameters (e.g., a Block size parameter, etc.). For example, the PREF parameter may correspond to a value that may influence the selection of a customer site. In an exemplary implementation, the higher the PREF parameter value, the better or more important the customer site may be considered. PEs 215 typically broadcast their advertisements 225 to other PEs 215.

Based on this framework, referring to FIG. 2B, assume a similar scenario as that previously described in that PE 215-2 receives advertisement 225-3 from PE 215-1 of AS 210-1 and receives advertisement 225-4 from PE 215-3 of AS 210-3 in which VE_ID parameter values are the same between the two different ASs. Under these circumstances, in an exemplary implementation, PE 115-2 may advertise advertisements 225-5 and 225-6 to PE 215-1 of AS 210-1 and PE 215-3 of AS 210-3, respectively. As illustrated, advertisements 225-5 and 225-6 may each include the D_AS parameter. In this way, PE 215-1 and PE 215-3 may discern which advertisement 225 is to be used. Accordingly, PE 215-1 and PE 215-3 may setup PWs with PE 215-2. For example, PE 215-1 and 215-3 may setup outbound PWs 21 and 41, respectively, based on advertisements 225-5 and 225-6.

Since an exemplary implementation has been broadly described, variations exist. Accordingly, a detailed description of exemplary implementations is provided below.

Exemplary Device Architecture

Figure 3A:
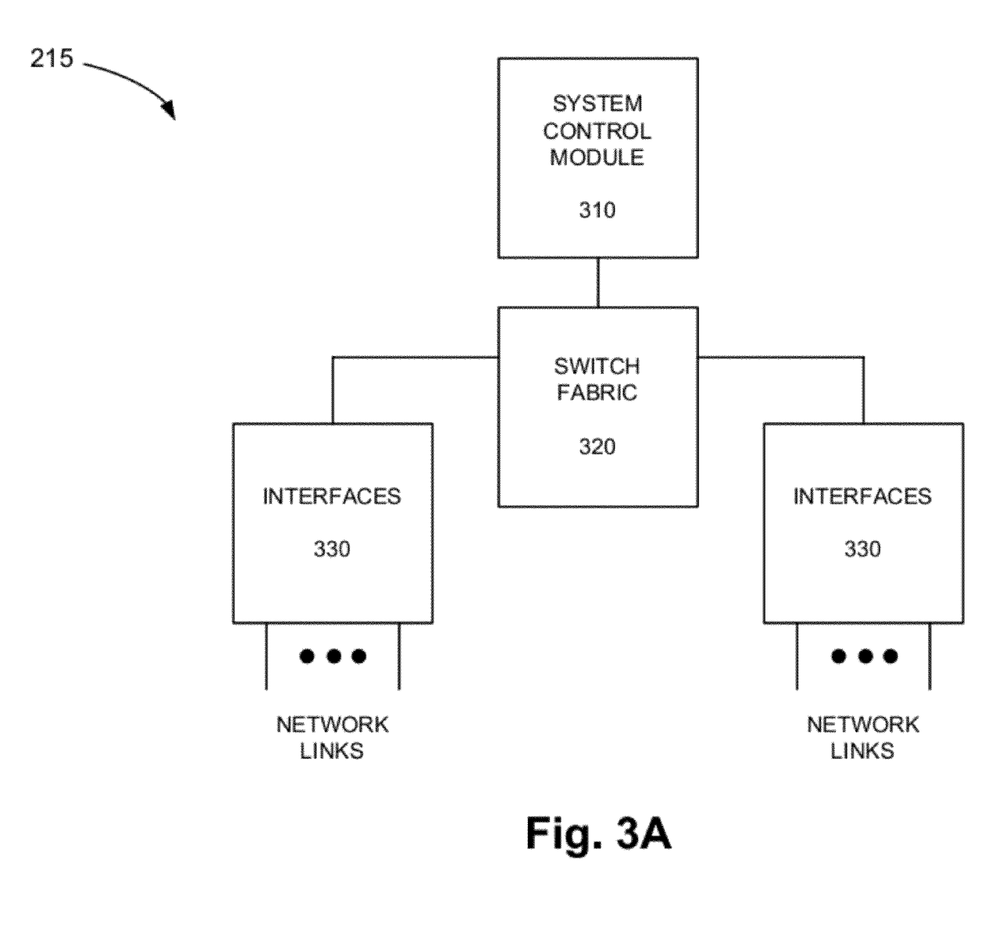
FIG. 3A is a diagram illustrating exemplary components of a PE depicted in FIGS. 2A and 2B.

FIG. 3A is a diagram illustrating exemplary components of PE 215. As illustrated in FIG. 3A, PE 215 may include, for example, a system control module 310, a switch fabric 320, and a group of interfaces 330.

System control module 310 may include one or multiple processors, microprocessors, application specific integrated circuits (ASICs), field programming gate arrays (FPGAs), and/or processing logic that may be optimized for networking and communications. System control module 310 may perform high level management functions for PE 215. For example, system control module 310 may communicate with other networks, devices, and/or systems connected to PE 215 to exchange information regarding network topology. In some implementations, system control module 310 may include a routing engine for creating routing tables based on network topology information, creating forwarding tables (e.g., a Forwarding Information Base (FIB)) based on the routing tables, and sending these tables to interfaces 330 for data unit routing. System control module 310 may also include a static memory (e.g. a read only memory (ROM)), a dynamic memory (e.g. a random access memory (RAM)), onboard cache, and/or flash memory for storing data and/or machine-readable instructions.

Switch fabric 320 may include one or multiple switching planes to facilitate communication among interfaces 330 and/or system control module 310. In one implementation, each of the switching planes may include a single-stage switch or a multi-stage switch of crossbar elements. Switch fabric 320 may also, or alternatively, include processors, memories, and/or paths that permit communication among system control module 310 and interfaces 330.

Interfaces 330 may include devices or assemblies, such as line cards, for receiving incoming data units from network links (or from other interfaces 330) and for transmitting data units to network links (or to other interfaces 330). For example, interfaces 330 may include wired interfaces, such as, Ethernet interfaces, optical carrier (OC) interfaces, and/or asynchronous transfer mode (ATM) interfaces. Interfaces 330 may manage a set of input ports via which data units can be received and a set of output ports via which data units can be transmitted. Interfaces 330 may include memory, one or more processors, and/or other logic.

Depending on the implementation, the components that are illustrated in FIG. 3A may provide fewer or additional functionalities. For example, if PE 215 performs an Internet Protocol (IP) data unit routing function as part of a MPLS router, system control module 310 may perform operations associated with obtaining routing information from other routers in an MPLS network. In such cases, conveying network traffic from one interface to another may involve label-based routing, rather than IP address-based routing.

PE 215 may perform operations and/or processes related to the advertisement, setting up, and utilization of PWs. According to an exemplary implementation, PE 215 may perform these operations and/or processes in response to system control module 310 executing sequences of instructions stored in a computer-readable medium. For example, software instructions may be read into a memory from another computer-readable medium or from another device via interfaces 330. The software instructions contained in the memory may cause system control module 310 to perform processes that are described herein. Alternatively, hardwired circuitry may be used in place of or in combination with software instructions to implement processes described herein. Thus, implementations described herein are not limited to any specific combination of hardware circuitry and software. A computer-readable medium may include a memory, a secondary storage (e.g., a hard disk, etc.), a compact disk (CD), a digital video disc (DVD), a Blu-Ray disc (BD), or the like. A computer-readable medium may correspond to a physical memory device or a logical memory device. A logical memory device may include memory space within a single physical memory device or spread across multiple physical memory devices.

Although, FIG. 3A illustrates exemplary components of PE 215, in other implementations, PE 215 may include additional components, fewer components, different components, or differently arranged components than those illustrated in FIG. 3A and described herein. Additionally, or alternatively, one or more operations described as being performed by a particular component of PE 215 may be performed by one or more other components, in addition to or instead of the particular component.

Figure 3B:
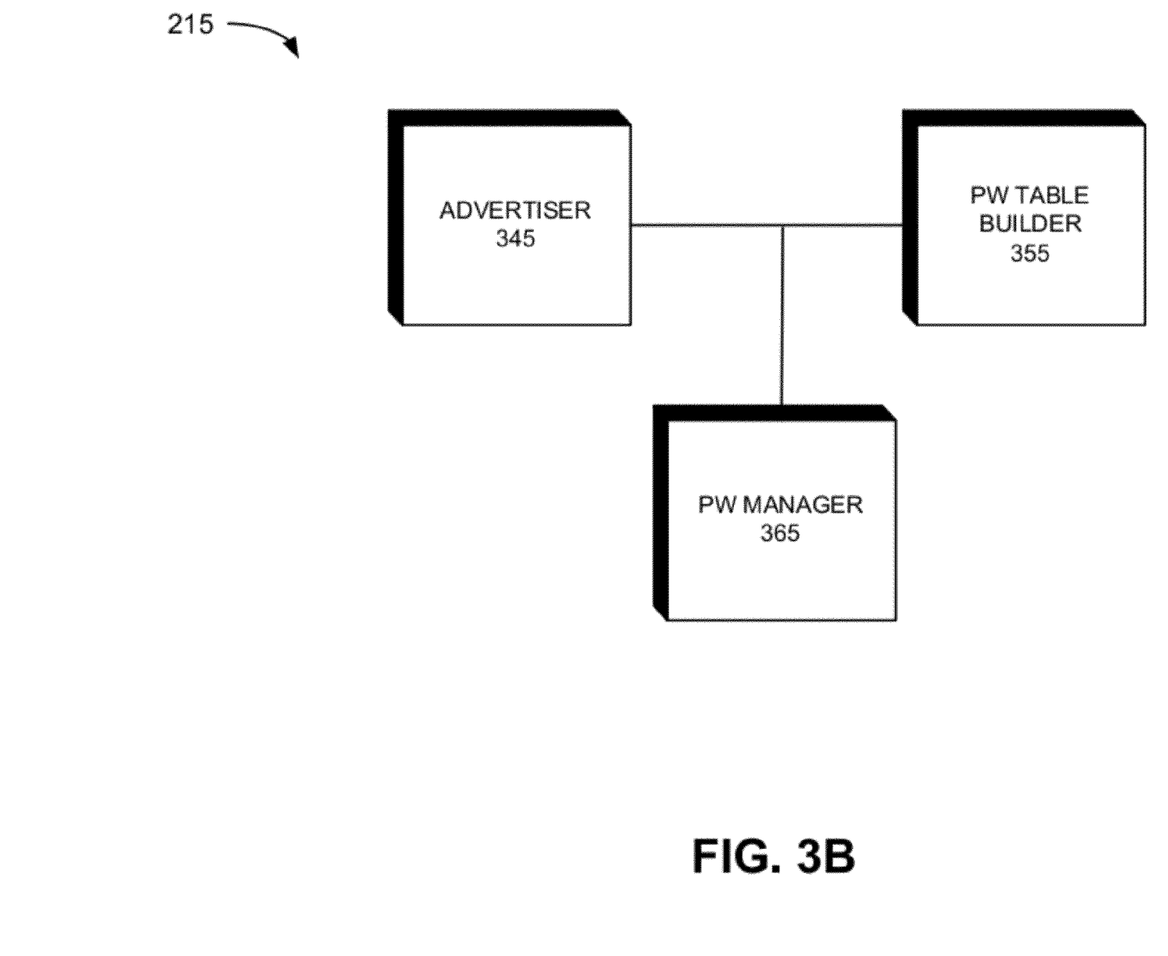
FIG. 3B is a diagram illustrating exemplary functional components of the PE.

FIG. 3B is a diagram illustrating exemplary functional components of PE 215. As illustrated in FIG. 3B, PE 215 may include an advertiser 345, a PW table builder 355, and a PW manager 365. Advertiser 345, PW table builder 355, and PW manager 365 may be implemented utilizing the exemplary components illustrated in FIG. 3A and described herein. The functional components illustrated in FIG. 3B may be implemented by hardware (e.g., one or more processors or other processing logic) or a combination of hardware and software. While a particular number and arrangement of functional components are illustrated in FIG. 3B, in other implementations, PE 215 may include fewer functional components, additional functional components, different functional components, and/or differently arranged functional components than those illustrated in FIG. 3B.

Advertiser 345 may generate and advertise advertisements 225 to other PEs 215. In a multi-AS network (e.g., network 205), advertiser 345 may include the S_AS parameter and the D_AS parameter. In an exemplary implementation, the values for the S_AS parameter and the D_AS parameter may be represented in a string and/or data having a certain number of bits or bytes. The string may be a numerical string, an alphanumeric string, or the like. Typically, a value associated with an AS is unique compared to other ASs in the multi-AS network. Thus, in advertisement 225, an S_AS parameter value may be unique compared to other S_AS parameter values, and a D_AS parameter value may be unique compared to other D_AS parameter values.

In an exemplary implementation, in addition to the S_AS parameter and the D_AS parameter, advertiser 345 may include other parameters in advertisement 225, such as, for example, the VE_ID parameter, the LB parameter, the OFF parameter, the PREF parameter, and/or the Block size parameter. In yet other exemplary implementations, advertiser 345 may include in advertisement 225 different parameters and/or additional parameters to those specifically described herein.

PW table builder 355 may build PW tables 130. The term "table," is to be broadly interpreted to include not only a table, but may take the form of other types of data structures (e.g., a list, etc.). PW table builder 355 may build PW tables 130 based on received advertisements 225 from other PEs 215. In an exemplary implementation, PW table builder 355 may utilize the D_AS parameter, in addition to other parameters associated with advertisement 225, to create PW table 130. In an exemplary implementation, as previously described, when VE_ID parameters are not unique (i.e., they are same) between two or more ASs, PW table builder 355 may select the appropriate advertisement 225 based on the D_AS parameter value. Additionally, as previously described, PW table builder 355 may distinguish one advertisement 225 from another advertisement 225 based on the S_AS parameter value. PW builder 355 may correspondingly create the appropriate PW table 130 for a particular PE 215 associated with a PW manager 365 may setup and maintain PWs based on PW tables 130. PW manager 365 may select PWs to utilize for incoming and outgoing data units with respect to each of the other PEs 215 and the customer site(s) it services.

Figure 4A:
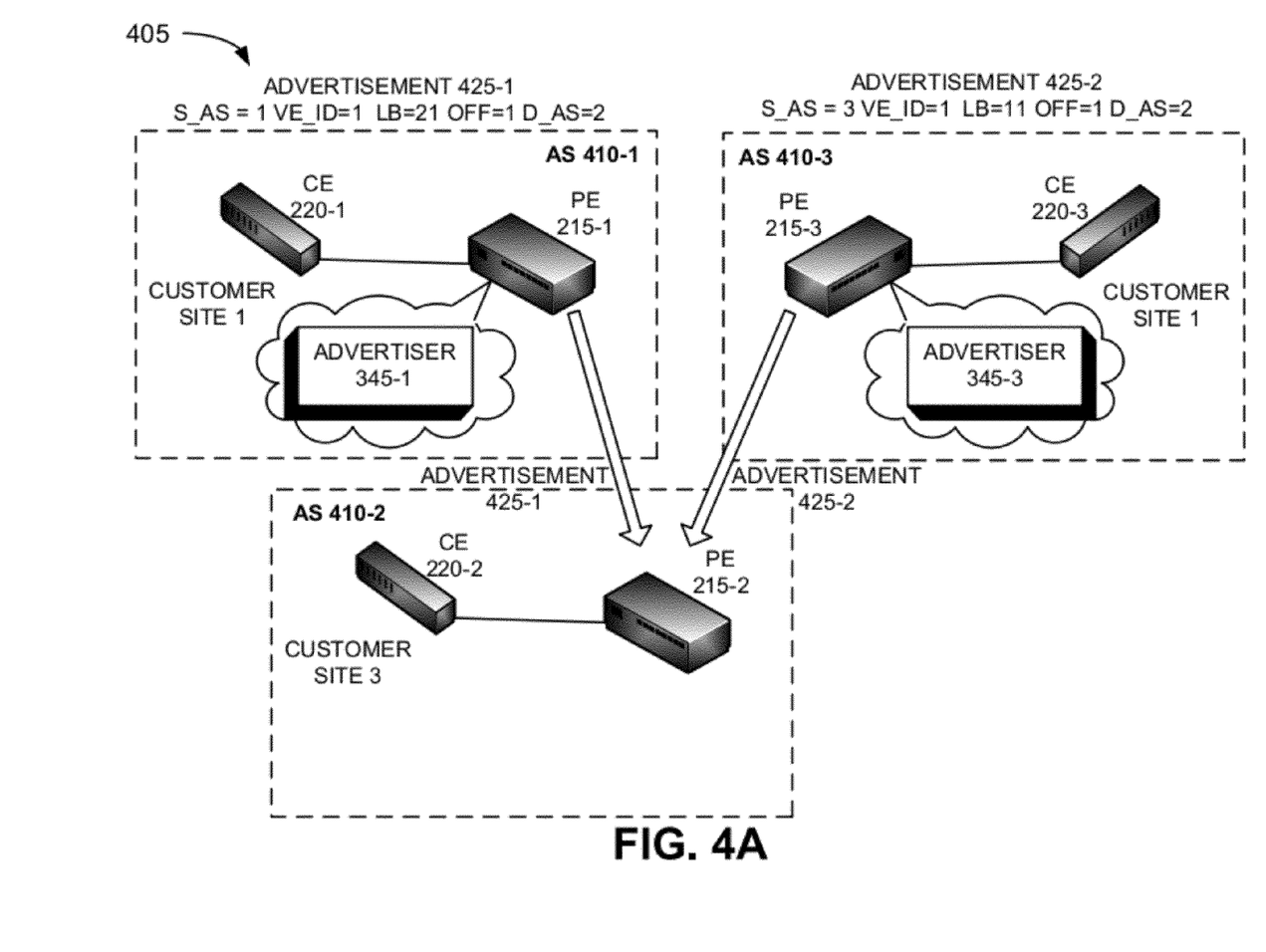
FIG. 4A-4D are diagrams illustrating exemplary operations associated with the exemplary functional components described in FIG. 3B.

FIG. 4A-4D are diagrams illustrating exemplary operations associated with the exemplary functional components described in FIG. 3B. Referring to FIG. 4A, assume a multi-AS network 405 includes ASs 410-1, 410-2, and 410-3. AS 410-1 may include PE 215-1 and CE 220-1 that may service a customer site 1; AS 410-2 may include PE 215-2 and CE 220-2 that may service a customer site 1; and AS 410-3 may include PE 215-3 and CE 220-3 that may service a customer site 3. As illustrated, AS 410-1 and AS 410-3 may include customer sites having the same customer site IDs (e.g., VE_ID=1).

Advertiser 345-1 of PE 215-1 may generate advertisement 425-1, and advertiser 345-3 of PE 215-3 may generate advertisement 425-2 (referred to generally as advertisement 425 or advertisements 425). For example, advertisements 425 may include the S_AS parameter, the VE_ID parameter, the LB parameter, the OFF parameter, and the D_AS parameter. In this example, advertisements 425 may indicate a D_AS parameter value (e.g., D_AS=2) corresponding to AS 410-2. Advertiser 345-1 may send advertisement 425-1 to PE 215-2, and advertiser 345-3 may send advertisement 425-2 to PE 215-2.

Figure 4B:
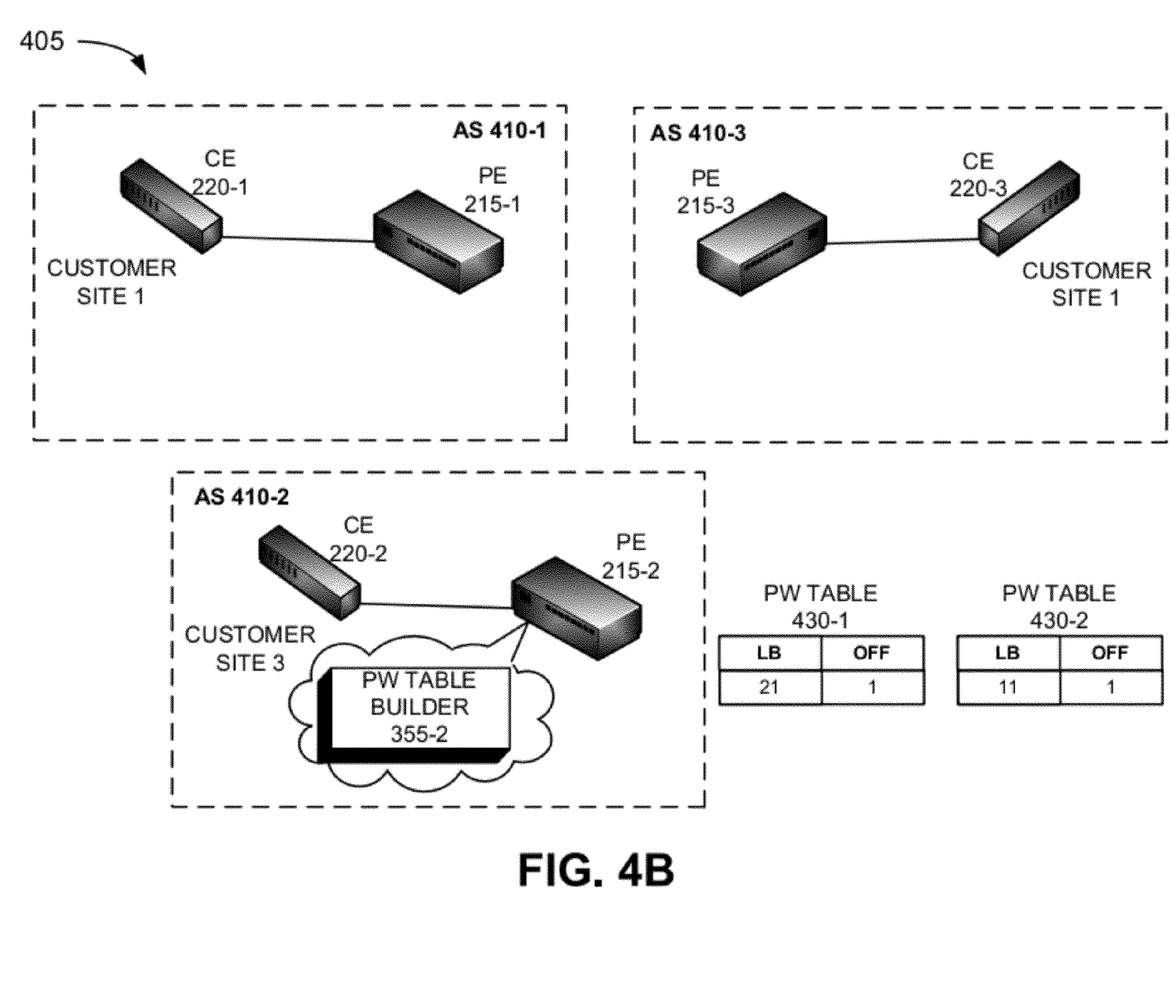
Figure 4C:
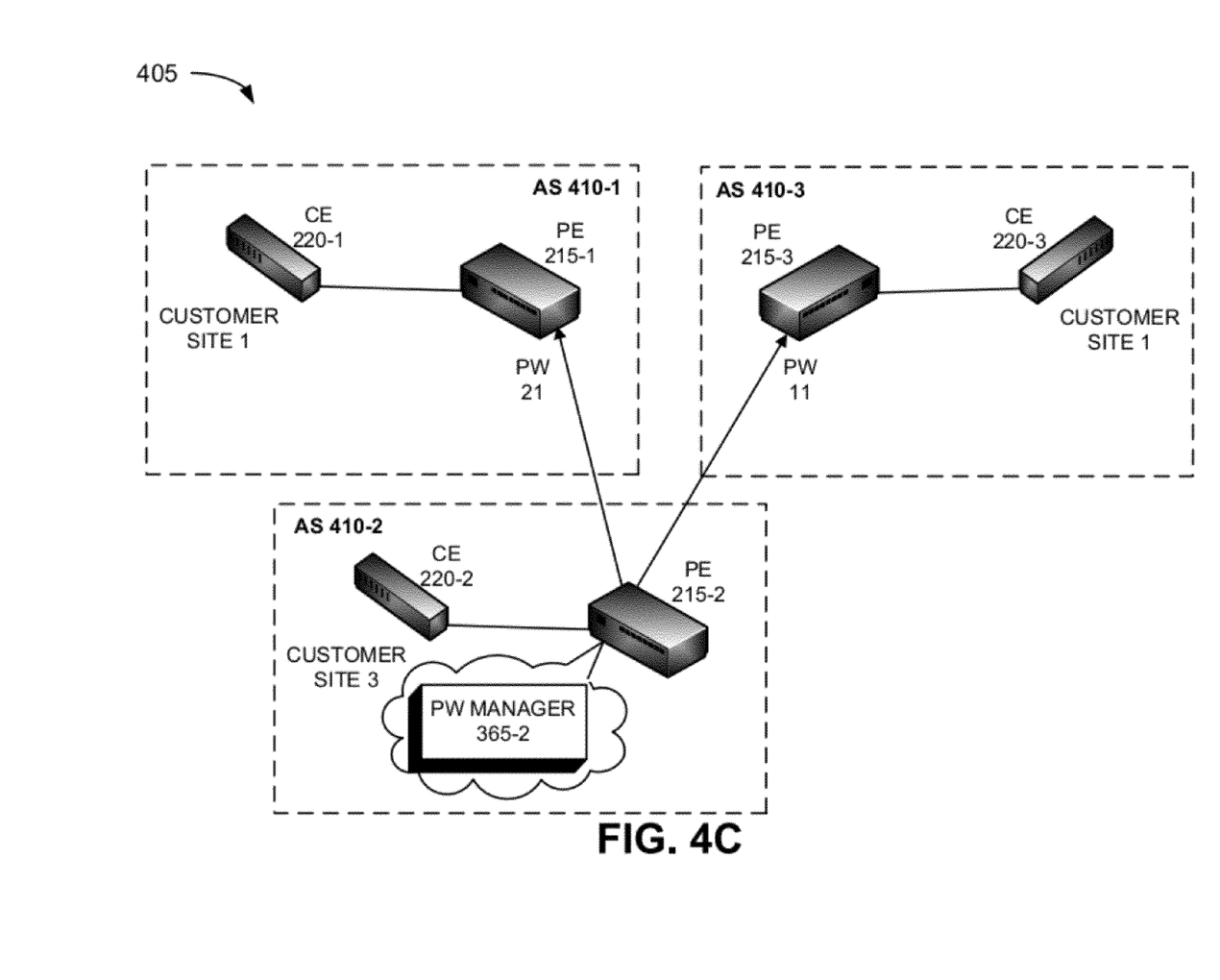
Figure 4D:
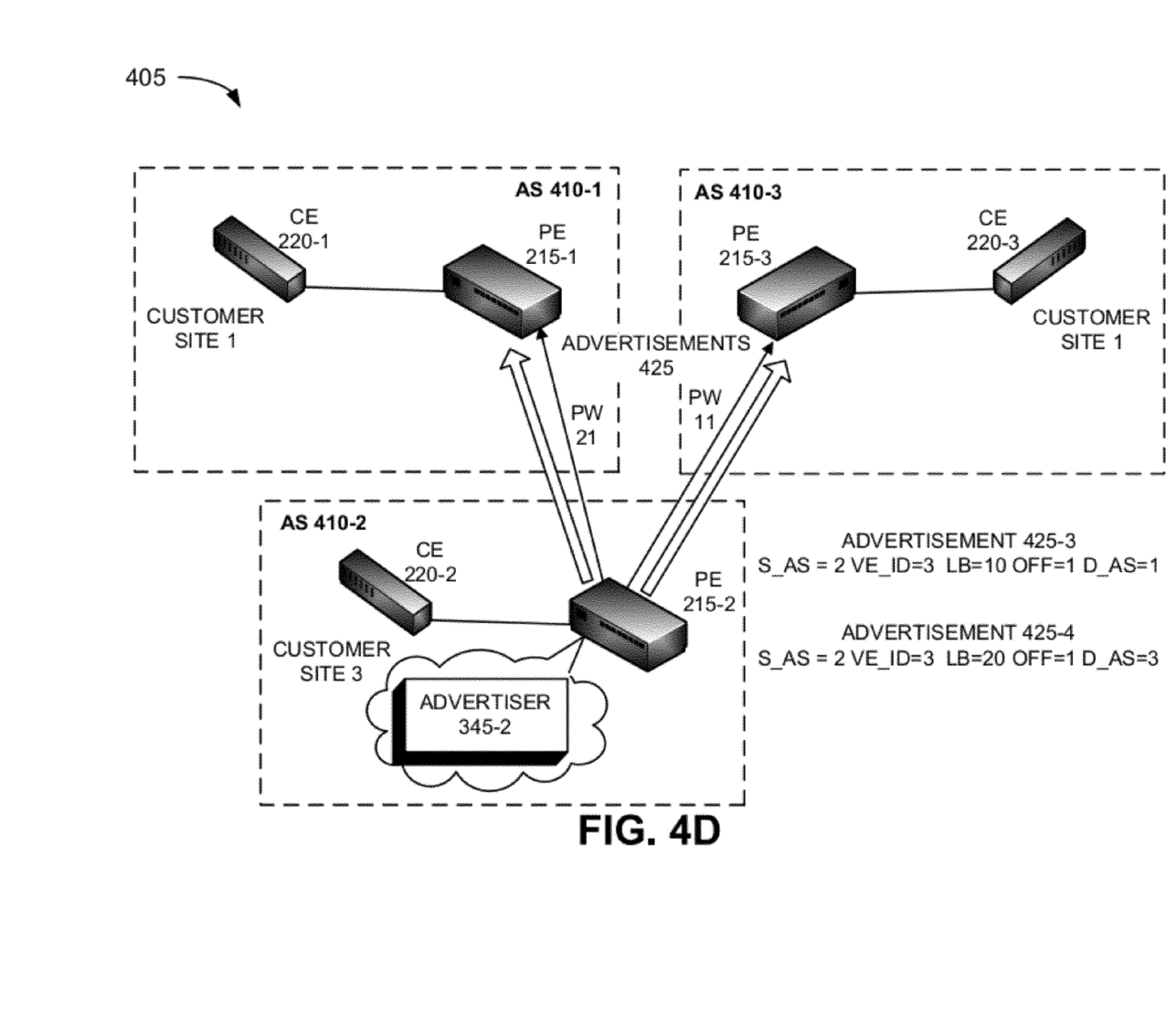

Referring to FIG. 4B, PE 215-2 may receive advertisements 425-1 and 425-2. PW table builder 355-2 may create exemplary PW tables 430-1 and 430-2 based on advertisement 425-1 and advertisement 425-2. As illustrated in FIG. 4C, PW manager 365-2 may setup PW 21 with PE 215-1 and PW 11 with PE 215-3. Advertiser 345-2 may send advertisements 425-3 to PE 215-1 and advertisement 425-4 to PE 215-3, as illustrated in FIG. 4D.

Although FIGS. 4A-4D illustrate exemplary operations associated with the exemplary functional components described in FIG. 3B, in other implementations, additional operations, fewer operations, and/or different operations may be performed other than those described and illustrated in FIGS. 4A-4D. Additionally, the order of operations described and illustrated in FIGS. 4A-4D are exemplary, and in other implementations, the order may be different and/or operations may be performed in parallel.

Exemplary Process

As described herein, PE 215 may include the D_AS parameter in advertisements to avoid customer site ID collision when two or more customer sites share the same customer site ID, such as in a multi-AS network. Described below is an exemplary process, which may be performed by PE 215.

Figure 5:
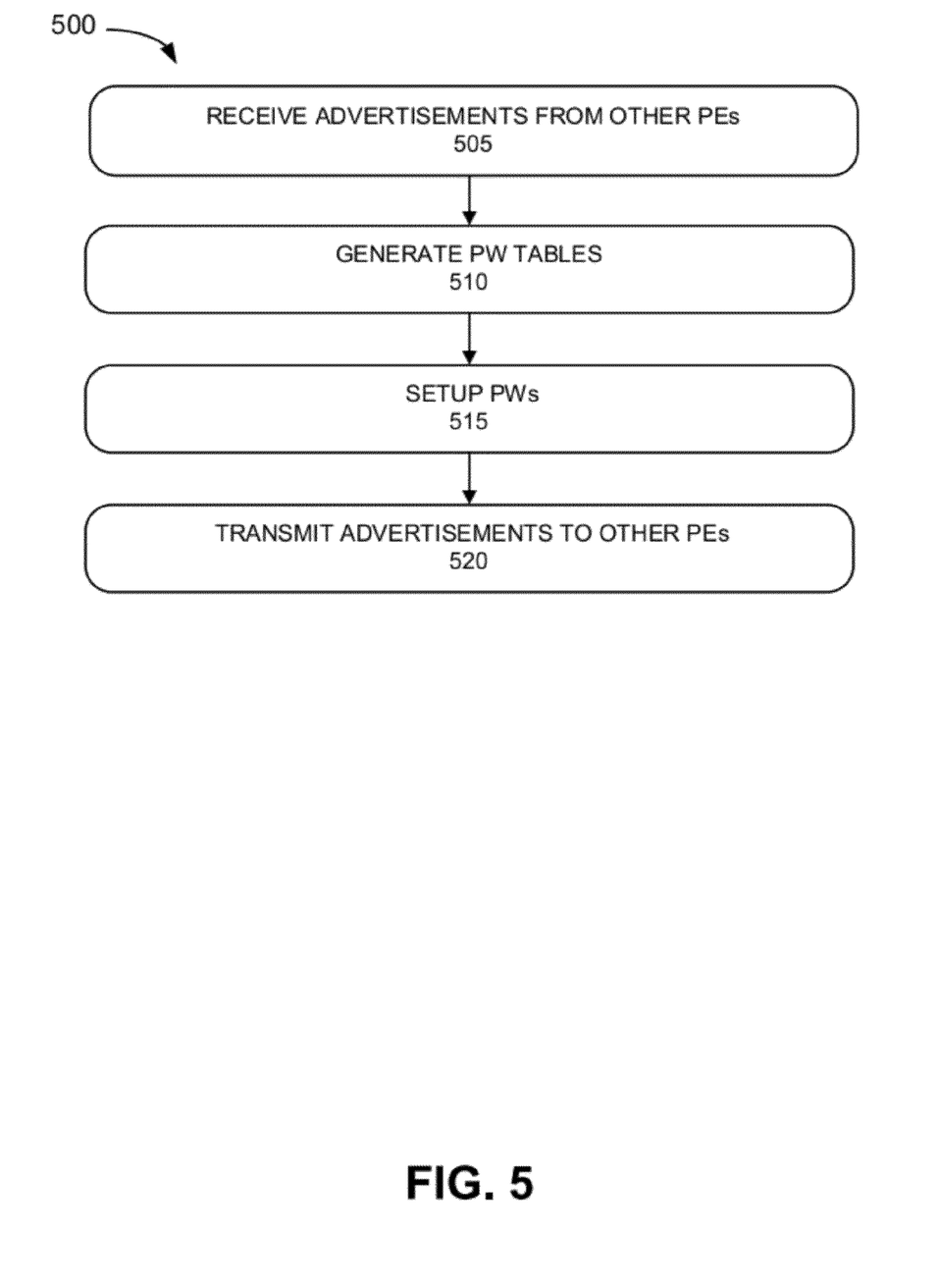

FIG. 5 is a flow diagram illustrating an exemplary process 500 to avoid customer site ID collision in a multi-AS. Process 500 may include receiving advertisements from other PEs (block 505). For example, in a multi-AS network, PE 215 may receive advertisements from other PEs 215 belonging to other ASs. The advertisements may include the D_AS parameter. In addition to the D_AS parameter, in an exemplary implementation, the advertisements may include the S_AS parameter, the VE_ID parameter, the LB parameter, the OFF parameter, the Block size parameter, and/or other types of NLRI, information for managing PWs, etc.

PW tables may be generated (block 510). For example, PW table builder 355 of PE 215 may create PW tables based on the received advertisements. PW table builder 355 may identify when two or more of the advertisements, from different ASs, include the same customer site IDs. In instances when advertisements from different ASs include the same customer site IDs (e.g., the same VE_ID parameter value), PW table builder 355 may create PW tables based on the D_AS parameter values associated with those advertisements. PW table builder 355 may create the PW tables associated with those advertisements based on one or more other parameter values (e.g., the S_AS parameter value, the LB parameter value, the OFF parameter value, etc.) included in those advertisements. In an exemplary implementation, PW tables may include LB parameter values and OFF parameter values.

PWs may be setup (block 515). For example, PW manager 365 of PE 215 may setup PWs between the other PEs 215, from which the advertisements are received, based on the PW tables. The advertisements may include the D_AS parameter. In addition to the D_AS parameter, in an exemplary implementation, the advertisements may include the S_AS parameter, the VE_ID parameter, the LB parameter, the OFF parameter, the Block size parameter, and/or other types of NLRI, information for managing PWs, etc.

Although FIG. 5 illustrates an exemplary process 500, in other implementations, fewer, additional, or different operations may be performed than depicted in FIG. 5 and described herein.

CONCLUSION

In exemplary implementations described herein, PEs in a multi-AS network may include a D_AS parameter that indicates a destination AS. In this way, PEs may setup PWs even when customer sites share the same customer site ID.

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 5, the order of the blocks may be modified in other implementations. Further, non-dependent blocks may be performed in parallel.

Also, certain aspects have been described as being implemented as a "component" that performs one or more functions. This component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items. The term "table," as used herein, is intended to be broadly interpreted to include any type of data arrangement and/or data structure.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   receiving, by a provider edge device (PE) of a multi-autonomous system (AS), advertisements from other PEs of the multi-AS,
   one of the advertisements including a destination AS parameter that indicates a destination AS of the one of the advertisements;
   generating, by the PE, pseudo-wire (PW) tables based on the advertisements received from the other PEs when the destination AS parameter includes a value that matches an AS value associated with the PE; and
   establishing, by the PE and based on the PW tables, PWs with respect to the other PEs.

2. The method of claim 1, where generating the PW tables comprises:
   identifying when two or more of the advertisements, from different ASs of the multi-AS, include a same customer site identifier parameter value; and
   generating the PW tables based on one or more parameters associated with the two or more of the advertisements, the one or more parameters including the destination AS parameter.

3. The method of claim 1, where generating the PW tables comprises:
   utilizing the destination AS parameter to generate the PW tables.

4. The method of claim 1,
   where the advertisements include network layer reachability information, and
   where the one of the advertisements includes a source AS parameter that indicates a source AS associated with one or more of the ASs of the multi-AS from which the one of the advertisements was sent.

5. The method of claim 1, further comprising:
   generating other advertisements; and
   transmitting the other advertisements to the other PEs,
   one of the other advertisements including a destination AS parameter associated with one of the other PEs.

6. The method of claim 1, where the multi-AS includes multiple service provider networks.

7. The method of claim 1, where the one of the advertisements further includes a customer site identifier parameter that identifies a customer site associated with a customer edge device.

8. The method of claim 1,
   where two or more of the advertisements, from different ASs in the multi-AS, each include the destination AS parameter and a customer site identifier parameter that identifies a customer site.

9. A provider edge device (PE) comprising:
   a memory; and
   one or more processors to:
   receive advertisements from other PEs in a multi-autonomous system (AS), one of the advertisements including a source AS parameter that indicates a source AS and a destination AS parameter that indicates a destination AS of the advertisement;
   generate pseudo-wire (PW) tables based on the advertisements received from the other PEs when the destination AS parameter includes a value that matches an AS value associated with the PE; and
   establish, based on the PW tables, PWs with respect to each of the other PEs.

10. The PE of claim 9, where the PE comprises a router.

11. The PE of claim 9, where the advertisements include one or more of a label base parameter or an offset parameter.

12. The PE of claim 9, where two or more of the advertisements are from different source ASs, and
where the two or more of the advertisements include customer site identifier parameters that include a same value.

13. The PE of claim 9, where the one or more processors execute one or more instructions to:
generate other advertisements,
one of the other advertisements including a source AS parameter associated with the PE and a destination AS parameter associated with one of the other PEs; and
send the other advertisements to the other PEs.

14. The PE of claim 9, where the advertisements include network layer reachability information.

15. The PE of claim 9, where the one or more processors are further to:
ignore one or more of the advertisements when the destination AS parameter includes a different value that does not match an AS value associated with the PE.

16. The PE of claim 9, where the multi-AS includes one of a multiprotocol label switching-based network, a border gateway protocol-based network, or a virtual private local area network.

17. A non-transitory computer-readable storage medium containing computer-executable instructions, the instructions comprising:
one or more instructions, executable by a provider edge device (PE), to receive advertisements from other provider edge devices (PEs) in a multi-autonomous system (AS),
one of the advertisements including a source AS parameter that indicates a source AS and a destination AS parameter that indicates a destination AS of the advertisement;
one or more instructions, executable by the PE, to generate pseudo-wire (PW) tables based on the advertisements received from the other PEs when the destination AS parameter includes a value that matches an AS value associated with the PE; and
one or more instructions, executable by the PE, to establish, based on the PW tables, PWs with respect to the other PEs.

18. The non-transitory computer-readable storage medium of claim 17, where the PE services one or more customer edge devices.

19. The non-transitory computer-readable storage medium of claim 17,
where two or more of the advertisements are from different source ASs, and
where the two or more of the advertisements include customer site identifier parameters with a same value.

* * * * *